Aug. 6, 1963
J. E. EILERSEN
3,099,859
APPARATUS FOR MAKING COMPOSITE TREAD RUBBER
Filed June 6, 1961
3 Sheets-Sheet 1
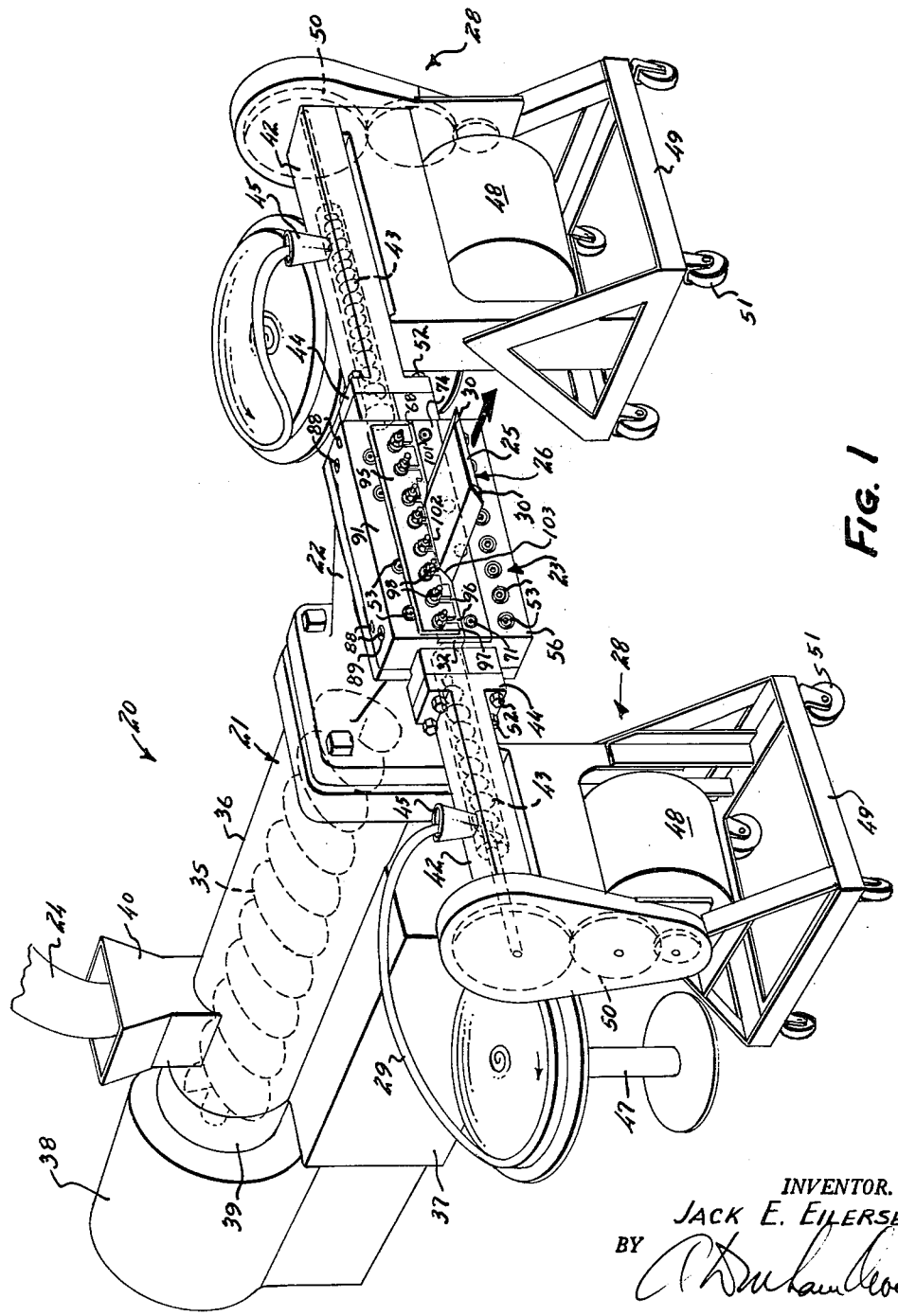
Fig. 1
INVENTOR.
JACK E. EILERSEN
BY 
ATTY.

Aug. 6, 1963 J. E. EILERSEN 3,099,859
APPARATUS FOR MAKING COMPOSITE TREAD RUBBER
Filed June 6, 1961 3 Sheets-Sheet 2
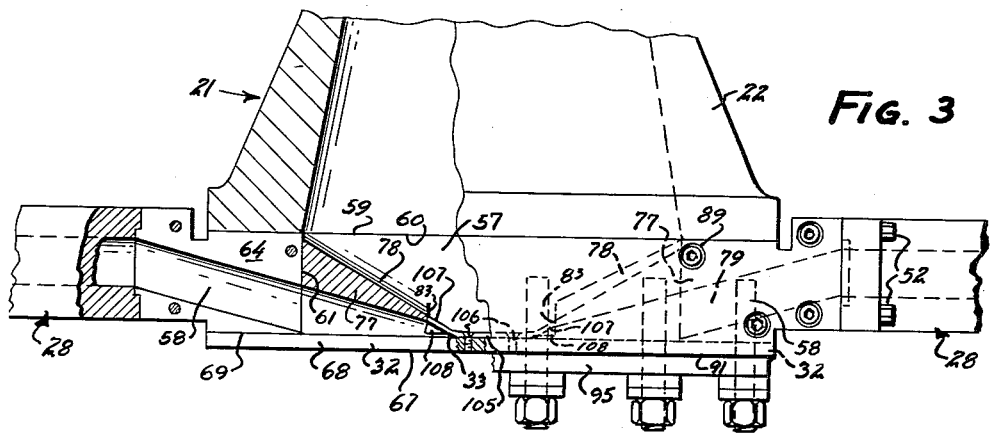
FIG. 3
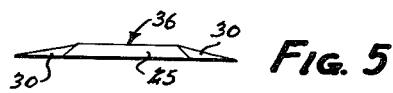
FIG. 5
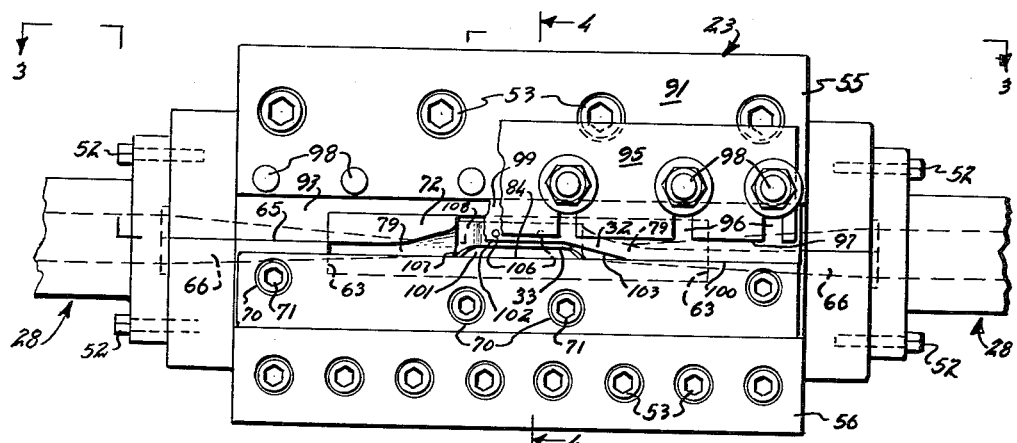
FIG. 2
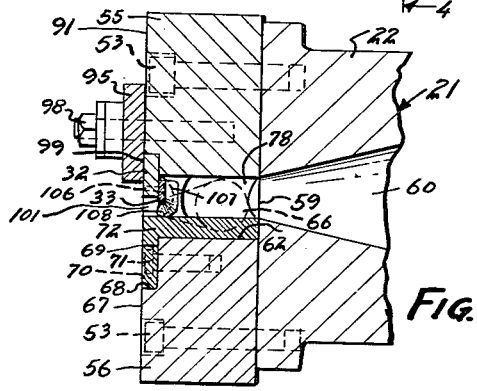
FIG. 4
INVENTOR.
JACK E. EILERSEN
BY 
ATTY.

Aug. 6, 1963 J. E. EILERSEN 3,099,859
APPARATUS FOR MAKING COMPOSITE TREAD RUBBER
Filed June 6, 1961 3 Sheets-Sheet 3

INVENTOR.
JACK E. EILERSEN
BY
ATTY.

United States Patent Office 3,099,859
Patented Aug. 6, 1963

3,099,859
APPARATUS FOR MAKING COMPOSITE
TREAD RUBBER
Jack E. Eilersen, Alameda, Calif., assignor to Oliver Tire & Rubber Company, Oakland, Calif., a corporation of California
Filed June 6, 1961, Ser. No. 115,262
12 Claims. (Cl. 18—12)

This invention relates to the manufacture of rubber camelback material for treading tires, and more particularly, it relates to an apparatus for forming composite camelback from at least two different sources of rubber material having the same or a different composition.

In the vehicle tire art it has been demonstrated conclusively that composite tire treading material for recapping tires has certain advantages and solves important problems pertaining to the durability and effectiveness of recapped tires. In such composite tire tread rubber material or camelback, the central portion which engages the road is preferably made from an abrasion resistant rubber composition while the wing portions attached to the central portion along the edges of the camelback, which extend down over the tire's sidewalls, are preferably formed from a more weather resistant rubber composition that will resist cracks caused by ozone and flexing. By forming the wing portion and the central tread portion in camelback from different sources of rubber, rubbers specifically compounded to give very high resistance to ozone may be used solely on the wings where it is most needed, and the necessity of using this relatively expensive anti-ozonant rubber in the central area can be avoided.

Another important reason for forming composite camelback from more than one type of rubber composition is that the wing portions being thinner than the central tread portion, tend to be overcured during the recapping process. To prevent overcuring, which ultimately results in cracking and loss of strength, the wing portions should be made from a rubber composition especially resistant to overcure.

Still another need for composite tire treads arose with respect to snow tires which are formed with a road engaging tread body having interspersed embedded particles such as sawdust or walnut shells which aid in providing traction in snow and ice. In such tires it was found to be highly desirable to form the wing portions of a dense rubber composition (free from particles) in order to provide better flex resistance and to thereby alleviate side wall cracking.

Despite the aforementioned advantages of composite tire treads, the art heretofore failed to provide an efficient, economical and versatile apparatus capable of producing a strong composite tire tread material. Prior to my invention, a serious problem in manufacturing composite tire treads was that of bonding the wing portions to the central tread portion with sufficient bonding strength. Thus, in an effort to provide this bonding strength between the rubber components in the composite tread rubber, the tread rubber was formed with wing portions connected by a relatively thin web portion, the central tread portion being bonded between the wing portions across the top of the web portion. An inherent disadvantage of this tread rubber structure was that it required a much greater bonding area between the adjoining rubber compositions, and therefore, the chance for failure of this bond increased when the tread rubber was bonded to a tire casing during a recapping procedure. When a tire is in use, all of the bonded areas, and particularly the area under the central tread, are subject to severe stress conditions. Hence, as a means of increasing reliability, it is essential to reduce to a minimum the amount of bonded area between tread components that could fail under such stresses. Another reason why the connecting web between wing portions is not desirable is that the rubber composition of the wing portions often does not have bonding characteristics as good as the rubber composition of the central tread portion, and therefore a stronger recapped tire is possible if the central tread portion can be bonded directly to the tire casing. Prior to the present invention the art did not provide an apparatus capable of producing composite tread and wings, without the interconnecting web member wherein the wing portions are bonded only to the sides of the central tread portion with a firm, durable and reliable bond.

In addition to the disadvantages of the prior art composite tread material, the apparatus heretofore used for making such materials was cumbersome, expensive, difficult to service, and lacking in the versatility for making camelback of different sizes. As a result, it had a limited production capacity and was subject to extended "down time" when repairs or adjustments were required, as for example, when the size or shape of the die required changing.

In contrast to the prior art camelback forming machines, the present invention provides an improved, relatively compact apparatus for forming composite camelback or tread rubber. My invention comprises a novel arrangement of components that utilizes a central tuber and two portable side tubers which can be quickly connected to a die block having an internal configuration which directs and confines the flow of rubber being forced through the die along three channels. A central channel carries the rubber forming the main cross-section of the tread and rubber for the opposite wing members is directed through side channels which run to the central channel. The channels are tapered properly to offer the least resistance to flow as the material is being forced through the die while being pressed into its desired shape. Another important feature is that the side channels are positioned relative to the central channel so that the rubber material moving therein will flow directly into the central stream and, by means of a novel die, will thus fuse together therewith in a firmly bonded joint. By a novel arrangement of elements in the die block, portions of the die block may be rapidly removed and replaced without disturbing the tubers when a different size of camelback or tread rubber is to be produced. However, a large selection of die sizes can be used even without changing the die block.

The power to force the rubber materials through the die is provided by the three separate tubers or screw extrusion means. The central tuber is connected to the die block and supplies rubber material under extreme pressure thereto. Relatively small and easily maneuverable side tubers are furnished on each end of the die block to supply separate streams of rubber for the wing members of the camelback. The central tuber may be speed controlled so that the relative velocity between merging streams of the central tuber and the side tubers can be controlled to produce a uniform cross-section of camelback.

Though my novel apparatus is useful primarily for making composite tread materials from different rubber compositions, it is also extremely useful for making extra large camelback material from the same rubber composition as the result of the combined capacities of the large and small tubers. Also, by interchanging the forming dies and adjusting the speed of the extruding tubers, a smaller size of camelback can be formed at a faster rate of speed.

In summarizing, it is one important object of the present invention to increase the availability of composite camelback material by providing a relatively compact and efficient apparatus for fusing three streams of rubber material together to form a composite strip of camelback material having a center portion of one type of rubber material and integral wing portions of another type of rubber.

Another object of the invention is to provide an improved apparatus for forming composite camelback having a convenient arrangement of a main tuber and side tubers feeding at substantially right angles to the main tuber and wherein the streams of rubber from the side tubers are directed at gradually reduced angles of incidence into a firm bonding engagement with the rubber flowing from the main tuber.

Another object of the invention is to provide an improved apparatus for forming composite camelback or tread rubber wherein the rubber for the wing portions of the camelback approaches the rubber for the central portion from the side and engages the central portion with a maximum of fusing pressure during the formation of the camelback.

Another object is to provide a composite camelback forming apparatus that channels together three sources of rubber material with a smooth flow that eliminates hangups or hot spots which can cause irregularities in the extruded camelback. An advantage in forming the camelback from multiple sources of rubber material is that the rubber material for the wing portions can contain compound ingredients which increase the flowing and displacement characteristics at the wing and the shoulder portions where these conditions are most critical.

Another object of the invention is to provide a camelback forming apparatus that can be quickly disassembled for cleaning or replacement of parts.

Still another object of the invention is to provide a camelback forming apparatus having means to accommodate the rapid interchange of components to provide for the manufacture of different sizes of camelback.

Another object of the invention is to provide an improved camelback forming apparatus that is easy to adjust during the extruding process since a separate tuber for each of the camelback components is arranged within close proximity to the die where its operation can be observed.

Another object of the invention is to provide an improved camelback extruding apparatus having a separate tuber for each component of the composite camelback material and wherein the speeds of the tubers are controllable to adjust the relative speeds of the streams of rubber for the wing portions and the central stream for the tube portion thereby providing a means to control the output of the extruding apparatus and a uniform shape of the camelback material.

Other objects and advantages of the invention will appear from the following description of a preferred embodiment in accordance with 35 U.S.C. 112.

In the drawings:

FIG. 1 is a view in perspective of the composite camelback making apparatus according to the present invention, as it appears when fully assembled and in operation;

FIG. 2 is an enlarged view in elevation of the outlet end of the apparatus, with portions of the die plate and its holder being broken away to show the internal structure of the die block;

FIG. 3 is a plan view of the die block and partially in section taken along the line 3—3 of FIG. 2;

FIG. 4 is a view in side elevation and in section of the die block and taken along the line 4—4 of FIG. 2;

FIG. 5 is a view in cross section of a section of composite camelback extruded from the apparatus shown in FIGS. 1–4;

Figure 6:
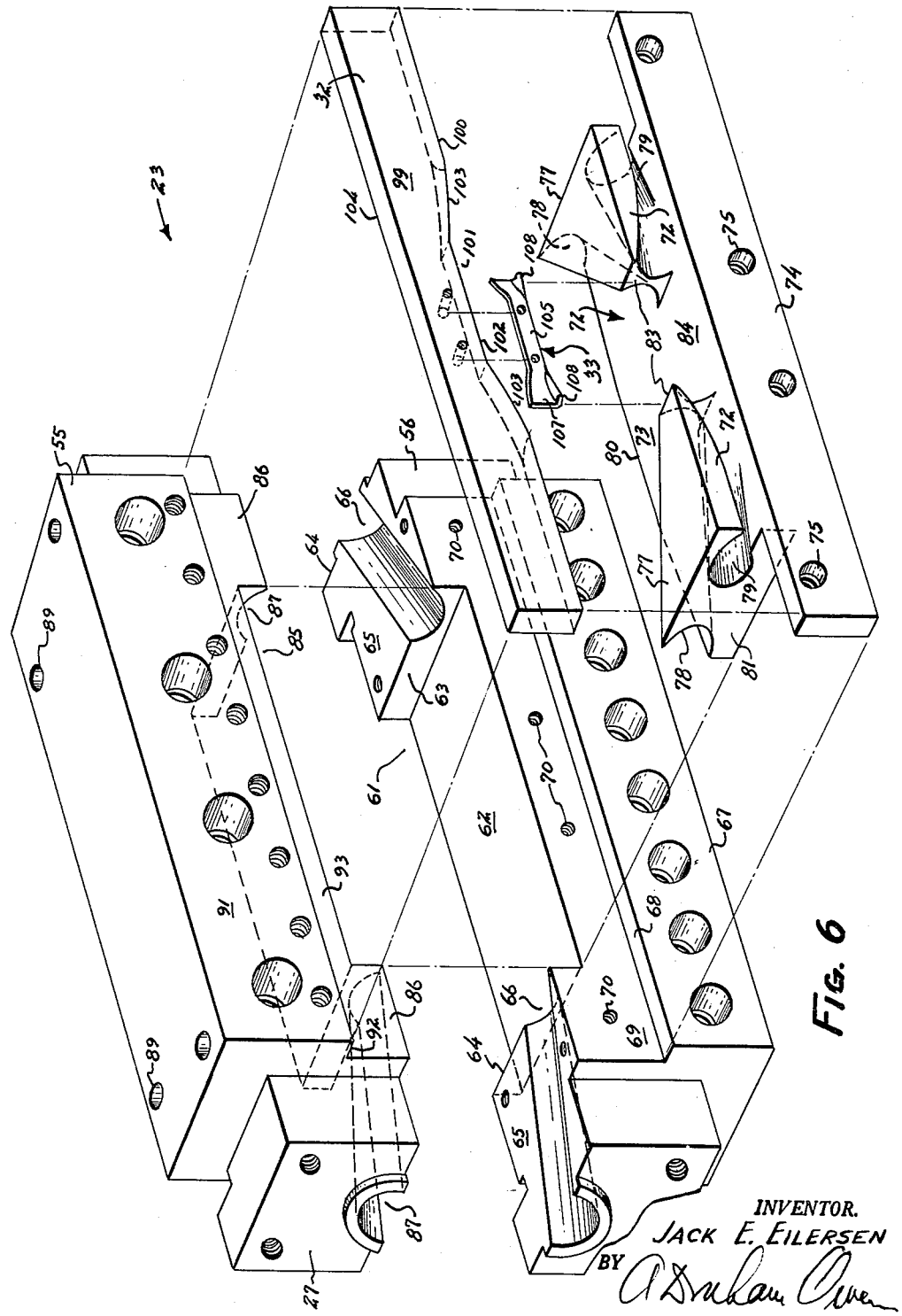

FIG. 6 comprises an exploded view in perspective showing the following major components of the extrusion die according to the invention:

A view in perspective of the lower half of the central die block;

A view in perspective of the upper half of the central die block;

A view in perspective of the die plate;

A view in perspective of the preforming die;

A view in perspective of the insert die member for the die block.

Referring now to the drawings, the composite camelback forming apparatus 20, according to the present invention is shown in FIG. 1 when fully assembled and in operating condition. Broadly speaking, the apparatus 20 comprises a relatively large central extruding device or tuber 21 of the type well known in the camelback extruding art. To the outlet end 22 of the central tuber 21 is connected an adapter die-block 23 which receives a supply of rubber 24 from the central tuber 21 that forms the central tread portion 25 of the camelback 26. At each end 27 of the die-block 23 is connected a similar but much smaller tuber device 28. Each said tuber 28 provides a supply of rubber 29 from a different source for the wing portions 30 of the finished camelback 26. The adapter die-block 23 is an important component of my novel apparatus 20 because it provides an efficinet means to merge together the central stream of rubber 24 from the large central tuber 21 and the side streams of rubber 29 from the side tubers 28. Attached to the adapter die block 23 at its outlet is a die plate 32 which determines the finel size and cross-sectional shape of the composite camelback 26. Fixed to the inside face of the die plate 32 and extending inwardly into the adapter die-block 23 is a novel preforming die member 33 (FIG. 6). The preforming die member 33, as will be shown later in the specification, functions in combination with the die-block 23 in a novel manner to bring together the merging streams 24 and 29 of rubber during the extrusion process to provide a strong uniform bond between the central tread portion 25 and the wing portions 30 of the camelback 26.

The central tuber 21 may be of the well known, commercially available form of tuber, and as shown in FIG. 1, it includes an extruding screw 35 which rotates in a housing 36 mounted on a heavy frame 37. The screw 35 is driven by a variable speed motor 38 through a gear train 39 so that adequate power at slow speeds can be provided to extrude the central stream of rubber 24. The rubber 24 for the central section 25 of the camelback 26 is fed into a hopper 40 mounted on the housing 36 which feeds the rubber 24 into the extruding screw 35 thus forcing it through the extruding outlet end 22.

The end or side tubers 28 are constructed in a manner similar to the main central tuber 21 except that they are considerably smaller in size. As a result, the side tubers 28 are highly mobile and can, with the adapter die-block 23, be conveniently moved away, so that the main tuber 21 can be utilized for making other forms of single material tread rubber. Each side tuber 28 includes an extruder housing 42 in which is mounted an extruding screw 43. Each housing 42 has a flared outlet end 44 and an inlet hopper 45 for the entrance of the raw rubber material 29 to the screw 43. The rubber 29 supplied to the hoppers 45 may be fed from a coiled supply mounted on a freely rotatable disc 46 mounted on a stanchion 47. A motor 48 is mounted on a frame 49 below the extruder housing 42 and drives the screw 43 through a reduction gear system 50. The frame 49 which supports the entire end tuber assembly 28 is mounted on casters 51 so that it can be easily maneuvered. The flared ends 44 of each side tuber 28 are attached to the ends 27 of the adapter die block 23 by means of bolts 52, and the adapter die-block 23 itself is attached to the flared outlet end 22 of the central tuber 21 by means of similar machine bolts 53.

To clearly illustrate the important features of the adapter die block 23, the die plate 32, and the preforming die 33 which cooperate to merge and bond together the three separate streams of rubber, to form the composite camelback 26, these components of my invention are shown first in enlarged sectional views in FIGS. 2–4 and also in an exploded assembly view in FIG. 6.

As shown in FIG. 2, the adapter die block 23 is formed by upper and lower adapter die block sections 55 and 56. When bolted together the sections 55, 56 form internally merging central and side passageways 57 and 58. The central passageways 57 of the die block 23 has an inlet opening 59 of a substantially rectangular shape which is adapted to fit over and match an extrusion passage outlet 60 of the central tuber 21 having a similar rectangular shape. As shown in FIGS. 3 and 4, the extrusion passage 30 of the central tuber 21 is gradually tapered from a cylindrical bore (i.e. 6 inches in diameter) to a rectangular opening of approximately 1 inch by 12 inches. Since the width of the completed camelback (FIG. 5) is considerably smaller than 12 inches, the central passageway 57 must, of course, be tapered inwardly from its inlet opening 59. In extrusion processes it is essential to assure the steady flow of material along the passageways, without abrupt turns, notches, or bends. My invention fulfills this requirement and yet provides for the extrusion of various sizes of camelback material by providing a lower die block section 56 capable of accommodating various sizes of interchangeable die inserts having central passages with different degrees of taper.

Describing now the adapter die block 23 in greater detail, its lower section 56 is generally rectangular in plan form, and as shown in FIG. 6, it has a central cutout portion 61 formed by a flat face 62 and end walls 63 which form raised end portions 64 each having a flat horizontal face 65. Across each raised end portion 64 is formed a channel 66 having a substantially semi-circular cross-section whose axis is directed toward the center line of the lower die block section 56. Extending longitudinally along the front face 67 of the block 56 is a shoulder 68 and above the shoulder 68 on a recessed face 69 are spaced apart tapped holes 70 which are adapted to receive bolts 71 for attaching an interchangeable die block insert 72.

The die block insert 72, as shown in FIG. 6, has a base center section 73 with a length equal to the length of the central cutout section 61 and a width equal to the end walls 62 of the die block section 56. Connected at a right angle to the base center section 73 of the insert 72 and along one side thereof is an attaching bracket 74 which has bolt holes 75 that have the same spacing and may be aligned with the tapped holes 70 in the recessed face 69 so that the insert 72 can be rapidly atatched to the lower die block section 56 by machine bolts 76. Extending inwardly from opposite ends of the base center section 73 of the insert 72 are two raised, symmetrical die portions 77 which are generally triangular in shape and which have converging side walls 78 and 79 that are curved in cross-section. Extending from the rear side 80 of the insert 72 are two converging side walls 78 of each triangular die portion 77, and extending inwardly from the ends 81 of the insert 72 are the front side walls 79 which, on each triangular die portion 77, terminate at a junction 83 with a rear converging side wall 78. When the insert 72 is in place in the lower die block section 56 the front side walls 79 have the same cross-sectional shape and axial direction as the converging channels 66 in the lower adapter die block 56 so that when the upper and lower die block sections 55, 56 and the die insert 72 are connected together, the continuously evenly tapered side passageways 58 are formed which merge with the central passageway 57 at the junctions 83. The converging rear side walls 78 may vary in their angle from the rear side 80 of the insert 72, for inserts of different sizes. By varying this angle of the side walls 78 the position of the junction 83 of the converging side walls 78 and 79 for each triangular raised die portion 77 will change and thus the width of the gap 84 between the junctions 83 will also vary to provide for different sizes of camelback.

The upper adapter die block section 55 has the same general rectangular shape which matches that of the lower die block section 56. It too has a central cutout section 85 having the same length and width as the center base section 73, the die insert 72. The cutout section 85 forms raised end portions 86 having channels 87 which match the channels 66 to form the side passages 58. The upper die block section 55 is attached to the lower die block section 56 by machine bolts 88 which extend through the countersunk holes 89 in the upper adapted die block 55 and into a series of tapped holes 90 in the lower die block 56.

Across the front face 91 of the upper die block section 55 is a shoulder 92 which forms a recessed face 93 on which is mounted the die plate 32. The die plate 32, shown in FIG. 6 may be formed from a rectangular piece of steel of uniform thickness, is adapted to rest on top of the attaching bracket 74 of the insert 72 and to extend across the opening formed by the junction of the central passage 57 and the side passages 58. The die plate 32 is preferably held in this position by a retaining plate 95 (FIG. 2) that has slots 96 along its lower edge 97 and is suspended by machine bolts 98 attached to the upper adapter die block 55. In attaching the die plate 32, it is placed in position on the edge insert 72 and the retaining plate 95 is lowered. The bolts 96 are then tightened to hold the die plate 32 in position.

On the front surface 98 of the die plate 32 and along the lower edge 100 thereof is an opening 101 having an elongated shape with a horizontal upper edge 102 and sloped sides 103 forming a final cross sectional shape of a composite camelback 26 extruded by the apparatus 20. The problem of running together the streams of rubber 29 from the side tubers 28 with the central stream of rubber 24 from the main tuber 21 is solved by the preforming die member 33 which is attached to the rear side 104 of the die plate 32.

The preforming die 33 has a straight central portion 105 in plan view (FIG. 3) which is fixed by screws 106 to the inner side 104 of the die plate 32 just above the die opening 101. As shown in FIGS. 3 and 6, end portions 107 of the preforming die 33 are first flared out rather abruptly from the inner side 104 of the die plate 32 and then are bent back gradually to an angle approximating the angle of the front side wall 79 on each die portion 77. The ends 107 of the preforming die 33 abut against the side wall junctions 83 of the raised triangular die portions 77 (FIG. 2) across the gap 84. Each flared end portion 107 of the preforming die 33 preferably has a lower flange 108 which extends from the preforming die 33 partially toward the die plate 32. The flanges 108 are also sloped in downward elevation at a greater angle and they extend slightly inside the sloped ends 103 of the die opening 101 as shown in FIG. 2.

Thus, at each end of the die opening 101 the rubber 29 passing from the side passageways 58 is directed by the preforming die 33 into bonding engagement with the softer rubber 24 that is extruded through the gap 84 of the central passageway 57. The rubber 24 flowing through the central passage 57 under the preforming die 33 thus forming the central tread portion 25 of the composite camelback 26 and the rubber 29 flowing from the side tuber passages 58 between the preforming die 33 and the die plate forming the wing portions 30 of the composite camelback 26. As the extrusion process takes place in my apparatus, the rubber 24 from the central passage 57 flows at least partially under the sloped end flanges 108 of the preforming die 33 and is merged with the rubber 29 flowing from the side tuber passages 58. The extreme pressure formed by the tubers 21 and 28 pushes the three streams of rubber together at these points and a bonding occurs just before the composite camelback merges from the preforming die 33. As a result of the novel shape and location of the preforming die 33 and the die plate 32, the wing sections 30 are bonded to the central tread section along a sloped line substantially similar to the slope of the flanges 108 of the preforming die 33 (see FIG. 5). By providing a sloped bonding line, a strong connection is formed between the central tread portion and the wing portions of the composite camelback.

The operation of my novel composite camelback forming apparatus may be reviewed briefly with reference to the drawings. The adapter die block 23 is first assembled by connecting together the upper and lower sections 55 and 56 by means of the bolts 88. The die insert 72, shaped to provide the desired size of camelback is then inserted between the upper and lower die sections 55 and 56, and is fixed in position by the bolts 76. The die plate 32 with its attached preforming die 33 is then placed over the opening 94 with the preforming die 33 extending across the gap 84 between the die portions 77. The assembled adapter die block 23 may then be attached to the flanged outlet end of the central tuber 21 and is retained thereon by bolts 52. The small side tubers 28 are then rolled into position and each is connected by its flared outlet end 44 and by bolts 53 to the ends 27 of the adapter die block 23.

The rubber composition 24 for the central tread portion is then fed into the hopper 40 of the large tuber 21 and is forced under pressure by the large extruding screw 35 to the adapted die block 23. Similarly, the rubber composition 29 for the wing portions is fed into the hoppers 45 of the small tubers 28 and is forced by the extruding screws 43 into the side passages of the adapter die block 23.

The rubber compositions 24 and 29 thus fed into the adapter die block 23 are bonded together by the merging together of the central and side passageways 57 and 58, through the novel coaction of the die insert 72, the die plate 32, and its preforming 33 as described previously.

From the foregoing it is apparent that the present invention provides a compact, efficient apparatus which produces a strong, composite camelback material. The novel arrangement of components makes it possible to produce camelback or tread rubber of various sizes by merely removing the die plate 32 and the die insert 72 and attaching components having different dimensions. With such interchangeability, the minimum in production time is lost. Another advantage of my novel apparatus is the fact that it utilizes only one of the expensive large sized tubers such as the tuber 21. The small side tubers 28 are tailored to provide only the capacity necessary to supply the wing sections, and these tubers, being small are relatively inexpensive and easy to operate and maneuver into position.

It is possible that various types of die heads could be used on the adapter die 23 in lieu of the die plate 32. For example, with extra large side tubers, an excess of rubber could be supplied to the wing portions and the conventional type of head with vertically adjustable die blocks could be used with a knife for trimming the surplus material from the ends of the wing portions in the well known manner.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An apparatus for forming a solid, composite rubber tire tread having a center portion of one rubber composition and attached side wing portions of a different rubber composition, said apparatus comprising: an adapter die block having front and rear sides and a main, central passage extending inwardly from said rear side into said die block and having converging side walls terminating within said die block at an opening, side passages having inlet openings in the ends of said die block, extending substantially transversely toward and merging with said central passage near its said outlet end and forming a common outlet for said merged passageways along the said front side of said adapter die block; a central tuber means connected to said rear side of said adapter die block for supplying rubber to said central passage to form said center portion of said tire tread; side tuber means connected to each end of said adapter die block for feeding a different rubber material under pressure to said side passageways; a die plate removably attached to said front side of said adapter die and covering said common outlet, said die plate having an extrusion opening on its outer side of substantially the same size and shape as the cross section of said composite tire tread; and a preforming die member on the inner side of said die plate having end portions extending inwardly into said adapter die for merging together and bonding the rubber in said side passages with the rubber from said central passage.

2. An apparatus for forming a solid, composite rubber tire tread having a center portion of one rubber composition and attached side wing portions of a different rubber composition, said apparatus comprising: an adapter die block having front and rear sides and a main, central passage extending inwardly from said rear side into said die block having converging side walls terminating within said die block at an opening, side passages having inlet openings in the ends of said die block, extending substantially transversely toward and merging with said central passage near its said outlet end and forming a common outlet for said merged passageways along the said front side of said adapter die block; a center tuber means connected to said rear side of said adapter die block for supplying rubber under pressure to said central passage to form said center portion of said tire tread; side tuber means connected to each end of said adapter die block for feeding rubber material under pressure to said side passageways; a die plate attached to said front side of said adapter die and covering said common outlet, said die plate having an extrusion opening on its outer side of substantially the same size and shape as the cross section of said composite tire tread; and a preforming die member on the inner side of said die plate and having end portions extending inwardly into said adapter die for merging together and bonding the rubber in said passages with the rubber from said central passage, said preforming die member having end portions abutting opposite sides of said opening formed by said converging side walls of said central passage.

3. The apparatus as described in claim 2 wherein each said end portion of said preforming die, when abutted against a said side of said central passage opening, is substantially in line with the adjacent said side passage and has a curvature for directing the flow of rubber in the said side passage along a path having a gradually decreasing angle of incidence with the rubber in said central passage thereby providing a firm bonding engagement between said merging streams of rubber.

4. The apparatus as described in claim 3 wherein each said end portion of said preforming die is sloped upward from the edge of said central passage opening and across the end of said opening in said die plate, thereby providing a sloped bonding line between the merged central portion and side portions of said composite tire tread.

5. An apparatus for forming a solid, composite rubber tire tread having a center portion of one kind of rubber and attached side wing portions of a different kind of rubber material, said apparatus comprising: an adapter die block comprising an upper die section, a lower die section, and an interchangeable insert die section between said upper and lower die sections, said die sections when assembled having front and rear sides and forming a main, central passage extending inwardly from said rear side into said die block, and having converging side walls terminating within said die block at an opening having a predetermined width, side passages having inlet openings in the end of said die block, extending substantially transversely toward and merging with said central passage near its said outlet end and forming a common outlet for said merged passageways along the said front side of said adapter die block; a central tuber means connected to said rear side of said adapter die block for supplying rubber under pressure to said central passage to form said central portion of said tire tread; side tuber means connected to each end of said adapter die block for feeding a different rubber material under pressure to said side passageways; a die plate removably attached to said front side of said adapter die and covering said common outlet, said die plate having an extrusion opening on its outer side of the same size and shape as the cross section of said composite tire tread; and a preforming die member on the inner side of said die plate and having end portions extending inwardly into said adapter die for merging together and bonding the rubber in said passages with the rubber from said central passage.

6. The apparatus as described in claim 5 wherein said upper and lower die sections have adjacent cutout portions extending from said front to said rear sides of said die block and forming together an opening to receive therein said insert die section.

7. The apparatus as described in claim 6 wherein said insert die section has a pair of substantially triangular shaped raised portions forming said converging side walls for said central passage and at least a portion of the side walls for said side passages.

8. An apparatus for forming a solid, composite rubber tire tread having a center portion of one rubber material and attached side wing portions of a different kind of rubber material, said apparatus comprising: an adapter die block comprising an upper die section, a lower die section, and an interchangeable insert die section between said upper and lower die sections, said die sections when assembled having front and rear sides and a main, central passage extending inwardly from said rear side into said die block and having converging side walls terminating within said die block at an opening having a predetermined width, side passages having inlet openings in the ends of said die block, extending substantially transversely toward and merging with said central passage near its said outlet end and forming a common outlet for said merged passageways along the said front side of said adapted die block; a central tuber means connected to said rear side of said adapter die block for supplying rubber under pressure to said central passage to form said center portion of said tire tread; side tuber means connected to each end of said adapter die block for feeding rubber material under pressure to said side passageways; a die plate attached to said front side of said adapter die and covering said common outlet, said die plate having an extrusion opening on its outer side of the same size and shape as the cross section of said composite tire tread; and a preforming die member on the inner side of said die plate and having end portions extending inwardly into said adapter die for merging together and bonding the rubber in said passages with the rubber from said central passage, said preforming die member having end portions abutting opposite sides of said opening formed by said converging side walls of said central passage.

9. The apparatus as described in claim 8 wherein each said end portion of said preforming die, when abutted against a side side of said central passage opening, is substantially parallel with an adjacent said side passage and forms a continuation of the side wall thereof, said end portion having a curvature for directing the flow of rubber in the side passages at a decreasing angle of incidence to and thus gradually toward the direction of flow of the rubber in the said central stream to thereby provide a firm bonding engagement therewith.

10. The apparatus as described in claim 9 wherein each said end portion of said preforming die is sloped upward from the edge of said central passage opening and across the end of said opening in said die plate, thereby providing for the engagement of the side rubbers with the central rubber stream along sloped bonding lines.

11. An apparatus for forming an elongated integral strip of material having a center portion and attached side portions, said strip being formed from at least two separate sources of pliable plastic-like material, said apparatus comprising: an adapter die block having front and rear sides and a main, central passage extending inwardly from said rear side into said die block with converging side walls, side passages having inlet openings in the ends of said die block, extending substantially transversely toward and merging with said central passage and forming a common outlet for said merged passageways along the said front side of said adapter die block; a central tuber means connected to said rear side of said adapter die block for supplying plastic-like material to said central passage to form said center portion; side tuber means connected to each end of said adapter die block for feeding a pliable, plastic-like material from a second source under pressure to said side passageways; a die head means removably attached to said front side of said adapter die and covering said common outlet, for merging together and bonding the plastic-like material in said side passages with the material from said central passage, and an opening in said die head means for extruding the bonded together materials in an integral strip having the desired cross-section.

12. An apparatus for forming an elongated integral strip of tread rubber material having a central portion and attached side portions, said strip being formed from at least two separate sources of pliable plastic-like rubber material, said apparatus comprising: an adapter die block having front and rear sides and a main, central passage extending inwardly from said rear side into said die block with converging side walls terminating within said die block at an opening having a predetermined width, side passages having inlet openings in the ends of said die block, extending substantially transversely toward and merging with said central passage near its said outlet end and forming a common outlet for said merged passageways along the said front side of said adapter die block; a central tuber means connected to said rear side of said adapter die block for supplying plastic-like rubber material to said central passage to form said center portion of said tread rubber; side tuber means connected to each end of said adapter die block for feeding a pliable, plastic-like rubber material from a second source under pressure to said side passageways; a die head means removably attached to said front side of said adapter die and covering said common outlet, said head means including means for merging together and bonding the plastic-like rubber material in said side passages with the rubber material from said central passage, and an opening in said die head means for extruding the bonded together materials in an integral strip having the desired cross-section.

References Cited in the file of this patent

UNITED STATES PATENTS

| 1,952,469 | Snyder et al. | Mar. 27, 1934 |
| 2,569,373 | Fay | Sept. 25, 1951 |
| 2,807,833 | Schanz | Oct. 1, 1957 |
| 2,897,543 | Weston et al. | Aug. 4, 1959 |